United States Patent Office 2,855,416
Patented Oct. 7, 1958

2,855,416

PROCESSING OF PHOSPHATIDES

Douglas J. Hennessy, Teaneck, N. J., and Edward E. Kupstas, New York, N. Y., assignors to American Lecithin Company, Inc., Woodside, N. Y., a corporation of Ohio No Drawing. Application November 24, 1953
Serial No. 394,219

5 Claims. (Cl. 260—403)

The present invention relates to the processing of phosphatides and it particularly relates to the production of new phosphatide products.

In the processing of phosphatides and particularly in extraction of phosphatides from various oil bearing nuts, seeds and fruits, and particularly in the extraction of phosphatides from soya beans and corn to obtain phosphatide products, considerable difficulty is experienced in separating the phosphatides from the oil of the nut, seed or fruit and also in obtaining phosphatide compositions which may be readily miscible with water and which will not tend to separate or give off non-miscible oily materials when used in various aqueous products, emulsions for use in the food, textile, leather and similar industries.

These phosphatides also contain carbohydrates, proteins, mineral salts and sterols which many instances detract from the desirable properties of the phosphatide.

It is among the objects of the present invention to obtain a novel phosphatide product by relatively inexpensive processing procedures, with the production of an improved phosphatide composition substantially reduced in or devoid of oil and which is more readily miscible in various aqueous compositions and which may be widely used in the food, textile, leather and other industries without likelihood of separation or introduction of undesirable oily compositions into the treating baths.

Another object is to provide a novel phosphatide composition which may be readily produced in connection with the processing and separation of oils from phosphatide containing materials, such as soya beans, cotton seed, peanuts and corn germ, and which at the same time may be in a form which will be readily miscible with water without the necessity of special treatment or drastic chemical change in the phosphatide molecules.

It is furthermore an object of this invention to treat the phosphatide emulsion which is centrifuged from or settled out of the crude oil, following hydration, so as to eliminate the necessity for drying the emulsion under vacuum.

It is another object of this invention to produce phosphatide products containing considerable amounts of water which exhibit better keeping properties than untreated phosphatides and can be conveniently used in aqueous media.

It is also an object of this invention to prepare phosphatide products which disperse or emulsify in water at pH 5 to pH 7 as well as over pH 7 and which will produce phosphatide products of superior emulsifying capacity.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In the separation of phosphatides from soya beans and other phosphatide containing materials, the material is first pressed or extracted to separate the glyceride oil together with a substantial part of the phosphatides.

The crude oil resulting from the pressing or solvent extraction will contain a major proportion of glyceride or soya bean oil up to 90% to 98% and usually only a small fraction containing phosphatides, sterols, mineral salts and carbohydrates.

The phosphatide fraction will include lecithin, cephalin and lipositol, as well as other phosphatide materials and also carbohydrates, proteins, mineral salts and sterols; the mixture of phosphatides with or without the oil, including lecithin, is quite usually referred to in commerce as commercial lecithin, which is primarily a mixture of about ⅔ phosphatides and ⅓ oil.

When solvent extraction is employed after removal of the oil extraction solvent, it is possible to separate a greater proportion of the soya bean oil and to obtain a phosphatide fraction, in which there will be about 25% to 40% soya bean oil and the balance the mixture of phosphatides by hydration or introduction of steam or water into the crude oil.

A somewhat similar composition with a small proportion of phosphatides may also be obtained in the form of tank settlings recovered from the bottom of storage tanks.

The mixture of the major proportion of phosphatides and the minor proportion of fatty oil resulting from hydration of the crude vegetable oil is then usually separated and treated under vacuum at an elevated temperature of 120° to 180° F. to remove the moisture to form the standard phosphatide or lecithin compositions of commerce, containing about ⅓ soya bean oil and about ⅔ lecithin and other phosphatides with carbohydrate, protein and minerals in smaller proportions.

This phosphatide composition, because of its high oil content, is relatively non-miscible with water and cannot be conveniently employed in commercial procedures involving the use of aqueous baths or solutions or high water content products, such as are encountered in the food, textile and leather industries.

Not only is the separation of the 20% to 40% of oil in commercial lecithin relatively expensive and costly, but in addition there remains a tendency towards mold or mildew formation or even oxidative deterioration with unpleasant odors and taste resulting where used in aqueous media.

It has now been found, surprisingly, that the phosphatides produced during the processing and separation of the crude oil, either in the form of the emulsion or the dried composition, may be readily treated with a water soluble organic per compound to enable a relatively rapid separation into an oil and modified phosphatides having most satisfactory miscible properties.

Peracetic acid is the preferred treating agent but it may be replaced by per-formic, per-propionic, or per-lactic acids.

When the emulsions of oil containing phosphatides are treated with 2% to 10% of peracetic acid and heated with agitation for about two to three hours with the addition of water followed by standing, it is found that separation of the vegetable or soya bean oil and water soluble carbohydrates, protein material and mineral salts from the phosphatides is accomplished.

The oil-containing phosphatide emulsion such as removed from the crude vegetable oil by centrifuging usually contains from about 25% to 55% water.

Where lecithin or phosphatide product is employed containing ⅔ phosphatide and ⅓ oil, from 3 to 6 volumes of water should be added to give an aqueous mixture after the per acid treatment.

The oil which separates to the surface of the aqueous medium in the per-organic acid treatment is a non-miscible, low viscosity oil and the lower phosphatide layer is substantially reduced in oil or contains small quantities of a hydrated or hydroxlated vegetable oil fraction which will not separate from a water dispersion as a scum or coating of a non-miscible oil.

The separated phosphatidic material will contain about 85% to nearly 100% of phosphatides mixed with water and the product obtained will be superior to the conventionally de-oiled solvent commercial phosphatide composition or commercial lecithin containing fatty oil.

The separated moisture containing phosphatide product or lecithin product will be miscible with water and in various aqueous treating baths, and even where there is a small amount of residual oil left in the phosphatide, such oil will not readily separate and appears to be of different character than the separated upper layer of fatty oil.

It appears that both the phosphatide and any retained oil are much more hydrophilic than the original fatty oil or the original vegetable phosphatide mixture or commercial lecithin.

It is not known whether this represents a modification of the phosphatide and oil originally extracted or whether it in fact results from a separation of the non-miscible oil from the commercial lecithin solids or emulsion or of other water soluble constituent, but a substantially novel phosphatide composition is produced.

It appears, however, that the separated phosphatide has been physically or chemically modified so that it is a novel product having high miscibility with water, forming in the proper proportion with water a transparent limpid fluid of low viscosity.

The process may also be applied to phosphatide compositions of animal origin including materials obtained from the processing of fish.

*Example I*

To give a specific example, the phosphatide emulsion which results from the introduction of steam or water in the manufacture of commercial lecithin from soya bean oil is treated with 2% to 10% of 40% peracetic acid based upon the weight of the water-free composition. The mixture is heated for 1½ hours and is maintained at a temperature of 60° to 80° C. or, preferably, between 70° and 75° C.

Then about 4 parts by weight of water are added for every one part of the commercial lecithin. The mixture is then brought to a boil and maintained at boiling temperature for 10 to 15 minutes.

After this boiling operation, the mixture is centrifuged or is permitted to stand and it will separate into three layers. The top layer will contain the oil in the form of substantial acetone soluble soya bean oil. The aqueous middle layer will contain the water soluble materials, for example carbohydrates and salts. The bottom layer will contain the hydrated phosphatides. The bottom layer may also contain a viscous acetone soluble oily material in amount ranging up to 20% of the phosphatides.

This novel phosphatide product may be readily separated by decanting or by centrifuging processes.

The bottom clear transparent phosphatide layer may be used as such, or may be treated to further reduce the water, mineral or carbohydrate content.

The lower hydrated phosphatide layer containing about 70% water still will retain the carbohydrate and mineral content dissolved in water. By washing the phosphatide layer with fresh portions of slightly acidified water and separating after each washing by centrifuging the carbohydrates and mineral salt content of the phosphatide layer is reduced to less than 10% of the original percentage of these constituents in the starting material.

This bottom layer may also be treated with various inorganic salts or with de-emulsifiers to remove additional water and it may be processed in other ways to obtain modified phosphatide.

The modified phosphatide is desirably maintained in slightly acid condition and may be conveniently used with a reduced water content of about 50%, although even with 70% to 75% the keeping properties are surprisingly superior to those of ordinary commercial lecithin emulsions.

The stability is improved by addition of small quantities of anti-oxidants of the phenolic type such as .01 to 0.1% of pyrogallol and the like.

In the above procedure, the initial phosphatide emulsion produced by steaming or adding water to crude vegetable oil frequently contains about 50% water and about 50% of an oil and phosphatide mixture, of which the oil will constitute about one-third and the phosphatides will constitute about two-thirds.

In the above example based upon 1000 parts by weight of this 50% emulsion are treated with 10 to 20 parts of 40% peracetic acid with subsequent addition of 1500 parts of water, there will result about 1100 to 1300 parts by weight of a phosphatide water mixture containing about 70% of water 30% of phosphatides with the phosphatides being substantially reduced in oil and water-soluble mineral salts and carbohydrate materials. The separated fatty oil will constitute about 160 to 180 parts by weight, whereas the middle water layer will constitute about 850 to 950 parts by weight, and this water will contain the water soluble materials. There are about 50 to 75 parts by weight of such last mentioned water soluble material. Evaporation and loss in transfer account for the rest.

Although the de-oiled mixture of phosphatides and water, containing about 70% water and 30% prosphatides, may be used as such to form emulsions with aromatic hydrocarbons, it is desirable in many cases to provide a material with reduced water content of less than 70% or 75% and this may be accomplished, for example, by adding small amounts of mineral acids such as dilute hydrochloric acid, dilute sulphuric acid or dilute phosphoric acid. This will result in separation of water and in production of a composition containing about 50% phosphatides and 50% water.

It has been found that the best separation is obtained by using a dilute acid which will reduce the pH to between 2 and 3 and this may be accomplished by adding 20 milliliters of 1 Normal hydrochloric acid to 480 grams of the 70% aqueous de-oiled phosphatide emulsion.

The washing with weak acid at a pH of 2 to 3 may be repeated several times to remove additional water soluble materials such as carbohydrates, mineral salts or protein materials.

The phosphatides which result apparently have a modified polarity with a reduced affinity for oil and an increased affinity for water.

Peracetic acid is the most satisfactory compound to accomplish this separation of the oil from the phosphatides, and it has not been found satisfactory to use hydrogen peroxide, nor to use per salts, nor to use inorganic per compounds or water insoluble per compounds.

The amount of peracetic acid is correlated with the time of treatment and the temperature so that at higher temperature the treatment is for a shorter time, while at the lower temperature the treatment is for a longer time.

The phosphatides, after reduction of water content, may be neutralized with organic bases such as ethanolamines or mixed isopropanolamines, or other non-volatile bases. Inorganic basic compounds may also be employed.

The final material after neutralization has a buttery consistency, or is like a soft jelly, depending on the moisture content.

The 50% de-oiled phosphatide composition, which is also reduced in water soluble compounds, may be further dried in the vacuum with or without the presence of suitable carriers, or it may be converted into a liquid by the addition of various organic solvents of the type known as Cellosolve or Carbitol. These compounds are generally the methyl, ethyl or butyl ethers or esters of mono-, di- or tri-ethylene glycols and they may be used in an amount of 10% to 50%.

The final novel phosphatide product appears to be less susceptible to charring and is resistant to development of yeasts or molds.

It may be taken up in organic solvents, particularly when rendered anhydrous, and then this organic solution may be readily emulsified in water with the phosphatide acting as the emulsifying agent. This is an effective method of emulsifying aromatic hydrocarbons and coal tar solvents.

It appears that the phosphatide and the oil fraction have been rendered hydratable rather than merely hydroxlated and that this hydrated product in either the form of a physical or chemical complex is a novel product having high miscibility with water to yield a clear limpid fluid when the proportion of water, the pH and content of other solutes are held within certain limits.

Commercial lecithin which has been treated and de-oiled with a per compound does not behave on dispersion in water as do the untreated phosphatide products.

*Example II*

To give another specific example, a commercial lecithin (phosphatide) emulsion which results from the introduction of steam or water into the crude oil in the manufacture of commercial lecithin from soya bean is treated with 1% to 5% of peracetic acid containing about 40% peracetic acid.

The mixture after agitation is permitted to stand overnight. Then 3 to 6 volumes of water are added and the composition is stirred for 20 minutes at 90° C. The water is drawn off and 2 more volumes of water are added to the lecithin layer which remains.

The mixture is stirred and then permitted to stand again for 24 to 36 hours when it separates into the three layers described.

The top layer will contain two-thirds to four-fifths of the oil in the form of acetone soluble soya bean oil.

The middle layer will contain water soluble materials.

The bottom layer will contain the hydrated phosphatides and also about one-third to one-fifth of an oil in the form of a novel viscous acetone soluble oily material which will not readily separate from the lecithin.

The bottom layer may then be readily separated by decanting or centrifuging processes.

The bottom layer, which contains principally phosphatides, may be used as such, but it may be dehydrated by vacuum evaporation or may be to a considerable extent salted out or be separated out by slight acidification and by addition of certain solvents.

Thus this bottom layer may be treated with various inorganic salts to remove additional water and it may be processed in other ways to obtain modified lecithin products.

As ordinarily obtained, the phosphatide composition is in slightly acid condition and prior to further treatment the water content is about 70%, though this may vary somewhat according to the processing.

These compositions may be neutralized with alkalies and especially with water soluble organic or aliphatic amines to yield improved phosphatide emulsifiers.

*Example III*

In another procedure, starting with dry commercial lecithin containing about two-thirds mixture of phosphatides and one-third oil, 500 grams of commercial lecithin was treated with 8% of a 40% peracetic acid. After one and one-half hours' stirring at room temperature, 1½ liters of water were added and stirred for fifteen minutes at 70° to 80° C.

After standing for fifteen minutes, another 1½ liters of warm water were added, the mixture shaken, and let stand.

The lecithin gradually settled to the bottom until three distinct phases were formed—a lecithin layer, a middle water layer, and a layer of oil on top.

The water dispersible bottom layer contained approximately 75% water. When this lecithin layer was heated with 5% to 10% of an inorganic salt, sodium chloride or magnesium sulfate, water separated and could be poured off.

About one-half of the water could thus be removed.

The separated oil-reduced lecithin was neutralized with isopropanol amine to give a good emulsifier.

The upper soya bean oil layer is readily separated by gravity or by centrifuging. At least 50% of commercial lecithin by weight may be recovered as oil. The oil is completely soluble in acetone.

There is a similar result when soya bean oil tank bottoms are treated with 4% to 8% of 40% peracetic acid.

Generally when about three times the amount of water was added by weight, followed by heating, there was the distinctive separation into three layers or phases enabling ready separation of the lecithin or phosphatides and the oil.

The phosphatides, whether they be lecithin, cephalin, or inositol phosphatide (lipositol) all appear to have improved characteristics.

*Example IV*

250 grams of liquid commercial lecithin were stirred with 5% to 40% peracetic acid (by weight) for two hours. Then 750 milliliters of water were added and this was stirred for ten to fifteen minutes at 60° to 70° C.

The mixture was poured into a separatory funnel and after standing the water drawn off.

About 400 milliliters of water were again added and the mixture set aside. After thirty-six hours the mixture separated into three distinct layers—a bottom lecithin layer, a middle water layer, and a top oil layer.

| | Grams |
|---|---|
| Weight of lecithin layer | 441 |
| Oil recovered | 54 |

The best results were obtained with 5% peracetic acid, which gave the sharpest separation.

If the bottom lecithin layer were stirred on a steam bath with 5% of a salt as magnesium sulfate or sodium chloride, about one-third of the weight could be removed as water. The lecithin layer changed to a thicker consistency resembling soft butter.

*Example V*

500 grams of soya bean oil tank bottoms or settlings from which free oil had been removed were treated with 20% peracetic acid (by weight) for one hour. Then 1½ liters of water were added.

The mixture was stirred for ten to fifteen minutes at 60° to 70° C. and poured into a separatory funnel. The water was drained off and one liter of warm water was added and the mixture put aside.

After forty-eight hours the mixture had separated into three phases, similar to that when commercial lecithin was used.

From 500 grams of tank bottoms 80 grams of oil were recovered; however, some of the excess oil had been poured off at the start, thus lowering the yield.

As a result of this treatment of tank bottom settlings a high grade lecithin product was obtained.

Hydrogen peroxide and mixtures of hydrogen peroxide and acetic acid give much less satisfactory results than peracetic acid and it required several days to one week before a satisfactory separation took place, which period would be too long for good commercial practices.

Example VI 200 grams of commercial lecithin emulsion was treated with 10 milliliters of perpropionic acid at room temperatures for sixteen hours, then heated with 500 milliliters of water and centrifuged into three phases.

The phosphatide layer resembled that obtained from peracetic acid by gravity separation over a period of twenty-four to forty-eight hours.

|   | Grams |
|---|---|
| Weight of lecithin layer | 220 |
| Oil recovered | 24 |

Example VII

This example is the same as the preceding Example VI, except that perpropionic acid is employed in the same proportion at temperature of 60° to 80° C. followed by separation in the centrifuging after the addition of the water and heating.

With separation by boiling and centrifuging, the minimum amount of water which should be added is 2½ to 3½ times (by weight) the amount of peracylated phosphatides used when the peracetic acid is 10% of the weight of lecithin.

In general, it is found that the best separation is given when the amount of water is more than 3½ to 3 times the weight of the total phosphatides of lecithin and with a temperature of treatment varying from 20° to 50° C.

The peracetic or other per acid should preferably be within the range of 5% to 40% and the peraliphatic acid is found to be much more satisfactory than other combinations, including hydrogen peroxide by itself or in combination with the corresponding organic acids not in per form, such as glacial acetic acid, in presence of sulphuric acid.

In general, the separated phosphatide produced with 50% to 70% water content, with or without further washing, may have its water content additionally reduced by vacuum distillation of mixture of aforementioned with relatively high boiling point solvents, such as kerosene, light mineral oil, vegetable oils, fish oils, or organic solvents, such as xylene, Carbitols and Cellosolves. There will remain behind an organic solvent solution of phosphatide devoid of water which for certain purposes is useful as an additive to printing inks, emulsifiers in cutting oils, food additives, and textile and leather treating agents. The modified product has essentially basic lecithin groupings, but with modified polarity due to the introduction of hydroxyl groups.

By combining the treated lecithin which contains water with organic solvents of the nature of butyl Cellosolve or ethyl Carbitol, special formulations may be prepared.

For example, to modified phosphatides containing 50% to 70% of water, there is added 15% of ethyl Cellosolve to form a clear jelly. With 25% of Cellosolve, a clear fluid is obtained and small amounts of residual acid in modified phosphatides may be neutralized with organic bases such as unified isopropinolamines after which butyl Cellosolve may be added in amount of 10% to give a clear jelly or in amount of 20% to give a clear liquid.

Gravity stratification generally takes about eighteen hours to seventy-two hours.

Preferably, however, water is added from two to six times the weight of the phosphatide.

The modified phosphatides produced by this treating and separation procedure may be used in the food, textile and leather industries without separation of fatty oil and it is relatively highly hydrophilic and water dispersible as compared to ordinary commercial lecithin. The removal of mineral matter and carbohydrate, accomplished without substantial hydrolysis of the phosphatide, not only modifies the phosphatide composition of this invention, but improves its use for purposes where such impurities or contaminants, bound as they are in ordinary phosphatides of commerce, are objectionable.

To summarize the above procedure:

(1) The commercial lecithin or lecithin emulsion is first treated with peracid with some heating up to 80° C. for periods up to 2 hours.

(2) Then water is added in quantity to get sufficient separation, which is about 4 times the amount of commercial lecithin or lecithin emulsion followed by heating to boiling point from 10 to 15 minutes.

(3) The oil, water and modified phosphatide are then separated by standing or centrifuging.

(4) The modified phosphatide layer with the oil mostly removed is then treated and dehydrated and neutralized and it may then be treated with solvents to remove additional water.

The amount of per acid, the length of time and the temperature may be widely varied, and the acid may range from 2½% to 25% per-acetic acid.

The new phosphatidic material contrary to ordinary commercial lecithin gives clear solutions when added to liquid soaps in small amounts and further is advantageous for use in soaps because of its greater stability.

As many changes could be made in the above procedure and processes of producing the same, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A process of separating phosphatides from a commercial lecithin composition containing about ⅓ soya bean oil and ⅔ phosphatide composition produced by treating the crude soya bean oil from soya beans with moisture which comprises mixing the composition with a small quantity of a water solution of a peracid selected from the group consisting of performic, peracetic, perpropionic and perlactic acids, heating the mixture and adding additional water, causing separation into an acetone soluble soya oil fraction and a hydrated phosphatide fraction and separating the phosphatide fraction.

2. The process of claim 1, which comprises using 2 to 10% of 40% peracetic acid followed by heating with agitation for about 2 to 3 hours followed by standing to cause the separation.

3. The process of claim 1, which comprises after mixing with the peracid, heating for 1½ hours at 60 to 80° C. then adding about 4 parts by weight of water for each part of the composition, then boiling for 10 to 15 minutes.

4. The process of claim 1, which comprises causing the separation by standing to produce an upper acetone soluble soya bean oil layer, an intermediate aqueous layer containing water soluble materials, and a bottom layer containing hydrated phosphatides.

5. The process of claim 1, which comprises producing the commercial composition by steaming crude soya bean oil to separate the phosphatide composition.

References Cited in the file of this patent

UNITED STATES PATENTS

| 2,073,011 | Hubbuch | Mar. 9, 1937 |
| 2,299,743 | Epstein | Oct. 27, 1942 |
| 2,445,948 | Wittcoff | July 27, 1948 |
| 2,508,624 | Singer et al. | May 23, 1950 |
| 2,629,662 | Julian et al. | Feb. 24, 1953 |

OTHER REFERENCES

Findley et al.: "Epoxidation of——Acid Solution"; 76, J. A. C. S. (1945), pages 412–414.